United States Patent [19]

Wevelsiep et al.

[11] Patent Number: 4,514,622

[45] Date of Patent: Apr. 30, 1985

[54] METHOD AND APPARATUS FOR IDENTIFICATION OF OBJECTS

[75] Inventors: Klaus Wevelsiep, Kriftel; Anton Kastner, Wiesbaden, both of Fed. Rep. of Germany

[73] Assignee: Scantron GmbH & Co., Frankfurt-Hoechst, Fed. Rep. of Germany

[21] Appl. No.: 308,713

[22] Filed: Jan. 5, 1981

Related U.S. Application Data

[63] Continuation-in-part of Ser. No. 140,936, Apr. 16, 1980, abandoned.

[30] Foreign Application Priority Data

Apr. 19, 1979 [DE] Fed. Rep. of Germany ....... 2915732
Oct. 17, 1980 [DE] Fed. Rep. of Germany ....... 3039191

[51] Int. Cl.³ .............................................. G06K 7/10
[52] U.S. Cl. ..................................... 235/463; 382/12; 382/36
[58] Field of Search ............. 235/463, 494, 462; 340/146.3 AC, 146.3 Z; 382/12, 36-38, 65

[56] References Cited

U.S. PATENT DOCUMENTS

| | | | |
|---|---|---|---|
| 3,906,202 | 9/1975 | Meyer | 340/146.3 Z |
| 4,020,357 | 4/1977 | Punis | 235/462 |
| 4,056,710 | 11/1977 | Shepardson | 235/463 |
| 4,059,224 | 11/1977 | Seligman | 235/494 |
| 4,086,477 | 4/1978 | Cowardin et al. | 340/146.3 Z |
| 4,272,675 | 6/1981 | Blanford et al. | 235/463 |
| 4,287,507 | 9/1981 | Janes et al. | 235/463 |
| 4,354,101 | 10/1982 | Hester et al. | 235/463 |

Primary Examiner—Donald J. Yusko
Attorney, Agent, or Firm—Townsend and Townsend

[57] ABSTRACT

Disclosed is a method and an apparatus for identifying objects, such as articles sold in a store, appearing in a random position and orientation and at random times on an image window. On a surface facing the image window, each object has an identification in the form of a field which comprises on at least one data track contrasting indicia with at least one contrasting line pattern identifying the position and the orientation of the data track. The track also includes a plurality of parallel lines with variable spacing and/or line widths. The image window is scanned line-by-line to generate a binary video signal which corresponds to the scanned contrast sequence. The length of the overlapping light and dark intervals of the video signal resulting from the scanning of the line pattern is measured and successively measured interval lengths are compared with each other and a comparison signal having a first amplitude is generated when the two interval lengths which are being compared have a predetermined ratio to each other which conforms to the spacing of corresponding pattern lines. An identification signal is emitted when during each of a number of successive comparison steps, the number of which is determined by the contrasting line pattern, a reference signal having the first amplitude is generated.

28 Claims, 13 Drawing Figures

METHOD AND APPARATUS FOR IDENTIFICATION OF OBJECTS

BACKGROUND OF THE INVENTION

This application is a continuation-in-part of U.S. patent application Ser. No. 140,936 filed Apr. 16, 1980, now abandoned.

The invention relates to a method and an apparatus for identifying objects appearing in a random position and orientation and at random times on an image window. On a surface facing the image window, each object has an identification in the form of a field which comprises on at least one data track contrasting indicia with at least one contrasting line pattern identifying the position and the orientation of the data track. The track also includes a plurality of parallel lines with variable spacing and/or line widths. The image window is scanned line-by-line and a binary video signal is generated which corresponds to the scanned contrast sequence. In a first step, the image window is scanned from varying angles or directions until a contrasting line pattern is detected. In a second step, the position and alignment of the data field relative to the image window is determined and in a third step, raster scan is performed in the direction of the data track to read and decode the indicia present on the data track.

Such method and apparatus are already known. The objects to be identified are, for example, commercial goods, department store articles, or the like which are identified in machine readable form. For this purpose, appropriate identifications are applied to the objects by imprinting thereon with the desired code, for example the OCR code. The uncoded information may comprise indications of quality, size, price, the number of the articles, and so forth.

It is difficult to machine read such codes since the objects vary in size and since the code is frequently printed on adhesive labels which are applied to varying points on the article. Therefore, it cannot be assumed that the information can be found in a specific location with a fixed orientation and at predetermined time intervals. Thus, the reading of such codes cannot be compared with the reading of punched cards or the like, where a card is available in a precisely defined reading position at precisely fixed times. In the present case, the exact opposite applies. The data field on the object appears only more or less approximately at a specific place, and the alignment of the data field is to some extent arbitrary.

This type of method and apparatus for the identification of an object is used, for example, at the cash counters of supermarkets and the like in order to identify the price and/or the number of the articles which a customer wishes to buy and which he has brought to the cash counter for this purpose. The articles, such as boxes of varying shape and size, bottles, cartons, cans, and the like, are then placed individually into the image window with the surface bearing the data field directed toward the image window. The data fields on the various objects thus appear in variable alignment at differing locations within the image window. The data fields also do not appear at the scanning station at fixed time intervals. Thus, the scanning station must be able to search for the data field and, once found, must readout the data track signals in the direction of the data tracks of the field. The readout signals can then be fed to the cash register in the form of electric impulses so that the cash register can print out on the cash rceipt the price, the number of the article, its classification, etc.

The data field applied onto the object is provided with a contrasting line pattern or product identification code ("PIC") which is defined by a plurality of parallel lines of varying spacing and/or line width. The purpose of the contrasting line pattern is to reliably and clearly distinguish the data field, for example the printed label, from other indicia or line patterns which may be present on the object in the vicinity of the data field. Further, within the data field the contrasting line pattern has a given position and orientation which can be used to ascertain the position and orientation of the contrasting line pattern—and thereby of the data tracks—relative to the scanning angle of the scanning line. This can then be used to subsequently raster scan the field in the direction of the data tracks perpendicularly over the code lines. Thus, the reliable identification of the contrasting line pattern represents an important step in the omnidirectional reading of visibly imprinted data fields.

U.S. Pat. No. 3,847,346 to Dolch discloses a method and an apparatus of the above described type wherein the identification of the contrasting line pattern occurs only when the lines of the pattern are oriented substantially perpendicularly to the scanning direction and the resulting pulse sequence of a video signal generated thereby equals a predetermined pulse sequence which corresponds to the contrasting line pattern used. In other words, the Dolch patent discloses a correlation method. It is particularly disadvantageous that the scanning of the image field for locating the contrasting line pattern must proceed in very small angular increments unitl a scanning line transsects the pattern vertically. This results in an undesireably long search time. Further, blurred printed edges of the contrasting line pattern may prevent a recognition of the pattern since in such an event the scanned pulse sequence and the resulting video signal may deviate from the stored reference pattern. As a result, either the search process must be repeated or the contrasting line pattern is not recognized at all, leaving the associated data field unread.

SUMMARY OF THE INVENTION

In contrast, it is an object of the invention to provide a method and an apparatus of the above described type which make possible a rapid and reliable identification of contrasting line patterns while generally preventing blurred edges of the lines from adversely affecting the readout.

In accordance with the invention this is achieved by measuring the length of time between successive rising, or ascending, signals and between successive falling, or descending, signals created as a result scanning, typically optically, a line pattern. Since the signals are binary in nature (high or low), the rising and falling signals necessarily alternate. This causes successive measured interval lengths to temporally overlap. Successively measured interval lengths are compared with each other and a reference or comparison signal having a first amplitude is generated when the two interval lengths which are being compared have a predetermined ratio to each other which conforms to the spacing of corresponding pattern lines. An identification signal (PIC OUT) is emitted when during each of a number of successive comparison steps, the number of which is determined by the contrasting line pattern, a reference signal having the first amplitude is generated.

The apparatus of the invention has an optoelectronic scanner which outputs binary video signals that correspond to the line-by-line scanned image field and comprises a series of light and dark intervals. The apparatus has a decoder for identifying a scanned contrasting line pattern of a plurality of parallel lines with varying spacing and/or line widths which characterizes the position and orientation of at least one data track of the data field. The apparatus further includes means for aligning the scanner parallel to the data track and for reading the indicia of the scanned data track.

In accordance with the invention the apparatus is characterized by a counting circuit which receives the video signals and determines the length of successive, overlapping video signal intervals. Further, the apparatus has at least one reference table which receives successively counted interval lengths in pairs via a gate circuit and emits a comparison signal having a first amplitude when two compared intervals lengths have a given ratio which corresponds to the ratio of the corresponding interval of the contrasting line pattern. An evaluation circuit is provided which generates an identification signal (PIC OUT) when a predetermined number of reference signals with a first amplitude have been generated.

The advantages of the invention reside particularly in that the identification of the contrasting line pattern is dependent only on whether the ratio of successive overlapping interval lengths of the video signal lies within narrow ranges. As a result, the contrasting line pattern is reliably identified even when scanning at an oblique angle to lines of the pattern since the ratios of successively measured interval lengths of th video signal are constant and do not vary with the scanning angle. Thus, a single scanning of the contrasting line pattern—at any desired angle—so long as all lines of the pattern are crossed, is sufficient for a reliable identification of the line pattern. The line pattern can, therefore, be rapidly identified with relatively few scans in which the angular inclination is varied in large increments.

The decoding of the video signal for detecting the contrasting line pattern in relation to the video signal must take place in real-time, that is substantially simultaneously with the generation of th video signal to ensure that the line pattern is identified anywhere within the video signal. Therefore, the determination of whether the ratio of successively measured interval lengths falls within a given value range, is carried out not by a division but by entering the value of the ratio into a two-dimensional comparison table, sometimes also called a division table. The table emits a reference signal of a given, first amplitude only when two interval lengths which are being compared lie in a predetermined field of the table where the quotient of the compared interval lengths has a value range which corresponds to that of the corresponding interval length of the searched for line pattern. The time and hardware consuming division process is thereby eliminated and real-time operation with regard to the video signal is maintained.

The comparison table is preferably in the form of a two-dimensional programmed read-only memory (PROM). The various possible discrete values of the first measured interval length address the lines of the memory. The various discrete values of the next following measured interval length address the columns of the memory. The expected field is defined so that it encompasses all storage points where the quotient of the interval length associated with the line address fall within a given value range. If a storage point within the expected field is addressed, then the PROM emits a comparison signal of a first amplitude which signals a partial identification of the line pattern. If, however, the storage point determined by the line column addresses lies outside the expected field then a comparison signal with a second amplitude is emitted to indicate that the quotient of the compared successive interval lengths lies outside the predetermined value range. When a reference signal with a second amplitude appears, the decoder is reset and ready for a new identification and decoding step.

Preferably, two interval lengths which are to be compared are fed into a separate comparison table with its own expected field and examined there with regard to their quotient value. Each individual comparison table preferably comprises as a separate PROM. This simplifies the control logic of the decoder.

In accordance with a preferred embodiment of the invention, eight bit memory positions are provided for the first PROM to compare the first and the second interval lengths as well as for the second PROM to compare the second and third interval lengths, and so forth. Thus, eight comparison tables, each with its own expected field can be accommodated in the PROM's, the first table being formed for example from the first bit of the memory positions, the second table from the second bit of the memory positions, and so forth. By selectively addressing and selectively reading out the table which is being used, it is possible to identify up to eight different contrasting line patterns with one decoding circuit, thereby enhancing the utilization of the apparatus in accordance with one aspect of the invention.

Preferably a first expected field is provided for identifying the interval length of a certain contrast line pattern measured successively in forward direction. A second expected field is provided for identifying these interval length successively measured in rearward direction. The contrast line pattern is scanned in "forward direction" when the contrast lines are read for example from left to right. The opposite direction is called the "rearward direction", i.e. in the rearward direction the contrast lines are scanned opposite to the usual reading direction, i.e. from right to left. If scanning is carried out in forward direction, and if the addressed lines and columns of the successively measured interval length lie in the first expected field, an identification signal PIC OUT V is emitted which includes the information that the contrast line pattern is identified in forward direction. If however, the contrast line pattern is identified by scanning in rearward direction, a second identification signal PIC OUT R is emitted which is different from first identification signal PIC OUT V. Thus, the first method step to find the contrast line pattern is substantially accelerated, i.e. the number of different angle scanning steps is reduced when the contrast line pattern is identified in forward and rearward direction. Time for carrying out one reading cycle is considerably reduced.

Since different contrast line patterns can be identified with a decoding circuit, it is possible to associate a certain information content with applied contrast line patterns. For example, an applied contrast line pattern may include information about the form of the indicia pattern in the data tracks. For example, a particular contrast line pattern may always be used if the first data track includes but alpha indicia, for example the name of the object to be identified. Alternatively, individual contrast line patterns may be printed before, behind or below the data tracks to signalize that the data tracks have a predetermined corresponding form.

If a particular contrast line pattern is identified, a corresponding individual identification signal is emitted, and this identification signal can be used to start corresponding control functions. For example, the identification signal can activate an Alpha-character decoder and a numerical character decoder, successively.

When the scanning beam sweeps over a darkly colored area of the data field, the binary video signal has a first amplitude "Hi", and it has a second amplitude "Lo" when the scanning beam sweeps over a light, signal-free area of the data field. The allocation of the amplitudes Hi and Lo is arbitrary, and a different allocation of the two amplitudes to light and dark areas of the data field is possible.

The intervals of the video signal, the length of which is to be measured, preferably extend from one rising slope of the video signal to the next rising slope, as well as overlapping therewith from one falling slope of the video signal between the rising slopes to the next falling slope. The third interval then extends from the second rising slope to a next rising slope, and so forth. The fact that the intervals extend from a rising slope to a rising slope, or from a falling slope to a falling slope ensures that blurred edges of the contrast lines of the contrasting line pattern—which generally extend in the same direction and in the same manner on all contrast lines—do not materially influence the interval lengths. Consequently the decoder can identify contrasting line patterns in accordance with the invention which were produced under variable printing conditions.

To enhance the reliability of the identification, contrasting line patterns having a signal-free lead zone of a given length can be employed. This lead zone is disposed ahead of the first line of the pattern. In such a case the measurement of the interval length is preferably initiated only when a signal-free lead zone of a predetermined length appears in the video dignal.

Measurement of the interval lengths is preferably terminated when a measured interval length exceeds a predetermined maximum which equals the maximum interval length present in the contrasting line pattern. An ongoing measurement of the interval lengths is preferably also terminated when the ratio of two successively measured interval lengths falls outside the predetermined value range. In both cases, the object identifying process is brought to a halt at the earliest possible moment and the decoder is reset and ready for a new cycle.

The ongoing measurement of the interval lengths is preferably also terminated when a signal-free intermediate zone of a predetermined duration which equals the maximum distance between the lines of the line pattern is detected. The decoding device is then reset and is ready for a new cycle.

The contrasting line pattern further preferably has a signal-free trailing zone the length of which corresponds, for example, to the length of the signal-free lead zone. In such an event a contrasting line pattern identification signal is preferably emitted only when the video signal also includes the signal-free trailing zone of predetermined length.

To enhance the redundancy of the identification process and thus reduce the probability of error, the same line is preferably scanned n times, and a contrasting line pattern identification signal is emitted only when the pattern has been successively identified n times.

The lengths of the overlapping intervals of the video signal are preferably digitally measured and for this purpose they are counted out in a counting circuit. The counting circuit includes a timing circuit which generates gate pulses of the same length as the corresponding intervals of the video signal. The length of a given interval of the video signal is measured with a counter which receives as an input the gate pulses of that interval. The inputs of the counters are further connected with a sync generator which emits sync pulses to the counters. The final count of the individual counters then corresponds to the length of the respective gate pulses and thereby to the length of the corresponding intervals. Successively counted interval values address the corresponding read-only memory after the subsequent interval value has been counted, and while counting of further interval values may still continue.

As already mentioned, each addressable location of the read-only memories stores a n-bit data word, n being preferably 8. The expected field for the m-th contrast line pattern PIC is stored in the m-th bit of the n-bit data words by keeping the respective bit "Hi". The outputs of the read-only memories are connected to a gating circuit, which emits an output after the addressing of the read-only memories, said output specifying which of the possible contrast line patterns $PIC_m$ is identified. If for example a first count is measured that addresses the line of the first read-only memory PROM 1, and if then a second count is measured which addresses the column of the first read-only memory PROM 1, the memory location defined by the addressed line and column emits a n-bit data word. The same applies for the second and third count which addresses a location in the second read-only memory, and the same applies for the third and fourth count which addresses a location in the third read-only memory.

The gating circuit connected to the outputs of the PROM's includes preferably n parallel AND-gates, $n \geq m \geq 1$; $m = 1, 2, 3 \ldots$. The number of input terminals of the m-th AND-gate equals the number of comparison tables or expected fields, i.e. the number of read-only memories. The input terminals of the m-th AND-gate receive the m-th bit of the n-bit data words read from the different read-only memories.

The m-th AND-gate emits an output signal $LPIC_m$, $m = 1, 2, 3 \ldots$ when all its input terminals receive the value Hi, i.e. when the m-th bit from the different read-only memories signalize that the quotient of the successively measured counts compared in the respective read-only memory lies inside the m-th expected field.

Preferably the apparatus is organized such that an identification of the scanning direction relative to the line sequence of a contrast line pattern $PIC_m$ is possible. For this purpose the successively measured interval length of the applied contrast line pattern $PIC_m$ as scanned in forward direction (from left to right) is associated to a first expected field. The successively measured interval length of the same contrast line pattern $PIC_m$ as scanned in reward direction (i.e. from right to left) is associated to a second expected field (comparison table). When identifying the contrast line pattern in forward direction and in rearward direction, respectively, an identification signal $PIC_m$ OUT V and $PIC_m$ OUT R is emitted, respectively, thus indicating also the scanning direction. It is the advantage of this embodiment of the invention that the sequence, i.e. 1, 2, 3 of the contrast lines can be identified when scanning this sequence in the direction 1, 2, 3, and when scanning this sequence in oppositive direction, i.e. in the sequence 3, 2, 1. By this feature a field rotation of maximally 180°—in different discrete angles—suffices to find any contrast line pattern, so that the searching time is reduced to about one half of the normal value.

BRIEF DESCRIPTION OF THE DRAWINGS

Embodiments of the invention are hereinafter described in greater detail with reference to the following drawings.

DETAILED DESCRIPTION OF THE PREFERRED EMBODIMENTS

Figure 1:
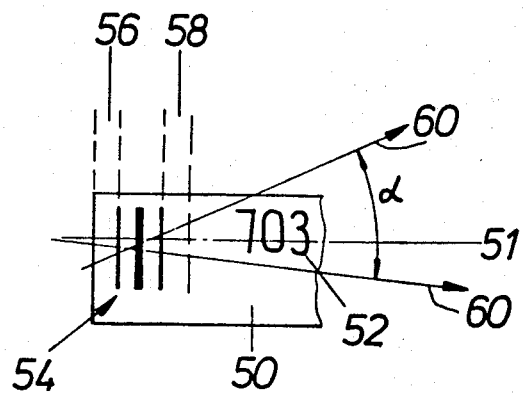
FIG. 1 shows a first arrangement of a contrasting line pattern within a data field having a data track.
Figure 2:
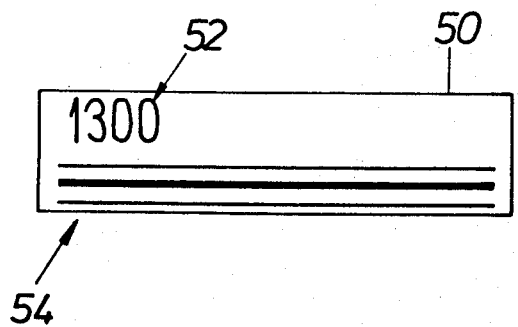
FIG. 2 shows a second arrangement of a contrasting line pattern within a data field.
Figure 3:
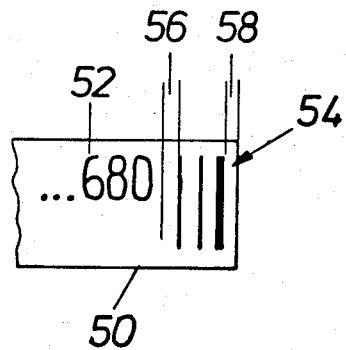
FIG. 3 shows a third arrangement of a contrasting line pattern within a data field.

FIGS. 1 to 3 show a variety of object identifications 50 such as adhesive price labels which are secured, for example, to a container, a package or on any other article (not separately shown), and which appear in random positions an orientations on an image window. The image window is defined, for example, by the optical aperture of a flying-spot scanner such as a vidicon, which first scans the image window line-by-line, and then in a linewise raster scan.

The identifications 50 have a data field which includes contrasting signals 52 in at least one data track 51 for identifying the object or article. The contrasting signals are preferably optical character signals of one of the known, machine readable types, for example OCR-A or OCR-B characters.

A contrasting line pattern 54—often referred to as position identification code or "PIC"—is in a predetermined position and orientation in relation to the date track and has a plurality of parallel contrast lines with varying spacing and/or line widths. In the embodiment shown in FIG. 1, the line pattern is located in advance of the data track, in the embodiment shown in FIG. 2 it is underneath the data track, and in the embodiment shown in FIG. 3 it is at the end of the data track. The contrasting line pattern 54 is asymmetrical in a direction perpendicular to the contrast lines so as to identify the data field with regard to the beginning and the end of the data tracks. The line patterns shown in FIGS. 1 and 2 have a signal-free lead zone 56 and a signal-free trailing zone 58.

Although the illustrated line patterns have only three lines each, patterns having more than three lines may be used. Further—an deviating from the illustration of FIGS. 1 to 3—to patterns may be located at a different position and have a different orientation in relation to the data tracks. It is further possible to provide two or more line patterns on one identification field 50.

As shown in FIG. 1, the image window, or an image corresponding to the window, for example on the target of a vidicon, is scanned step-by-step under an angle $a$ by at least one scan line 60. Before reading the data tracks, it is important to first reliably identify the line pattern and determine its position and orientation relative to the scan line 60 of the scanning beam since the signals contained in the data track can then be read by subsequent raster scanning in the direction of the data track.

Figure 4:
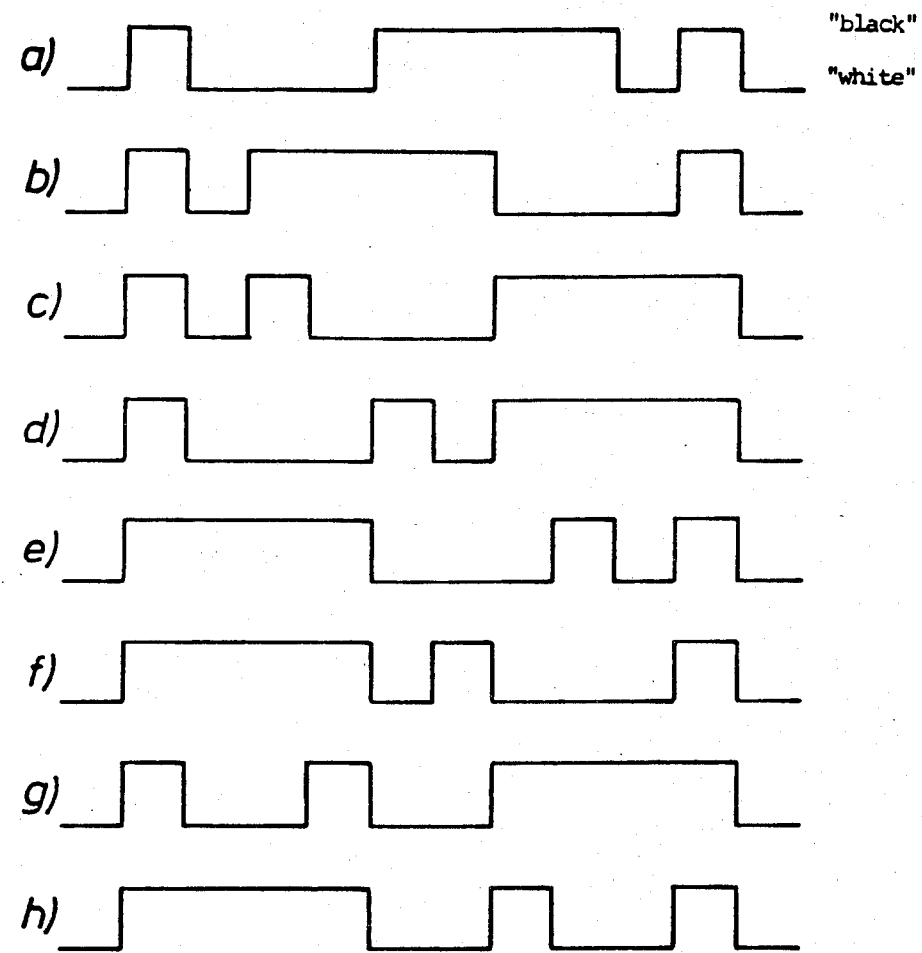
FIG. 4 shows the light-dark distribution of various contrasting line patterns taken perpendicular to the contrast lines.
Figure 4:
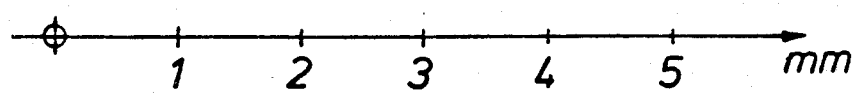

FIG. 4 shows the light-dark distribution of various three-line PIC patterns taken perpendicular to the direction of the individual lines which are all asymmetric and can therefore be used in accordance with the invention.

Figure 5:
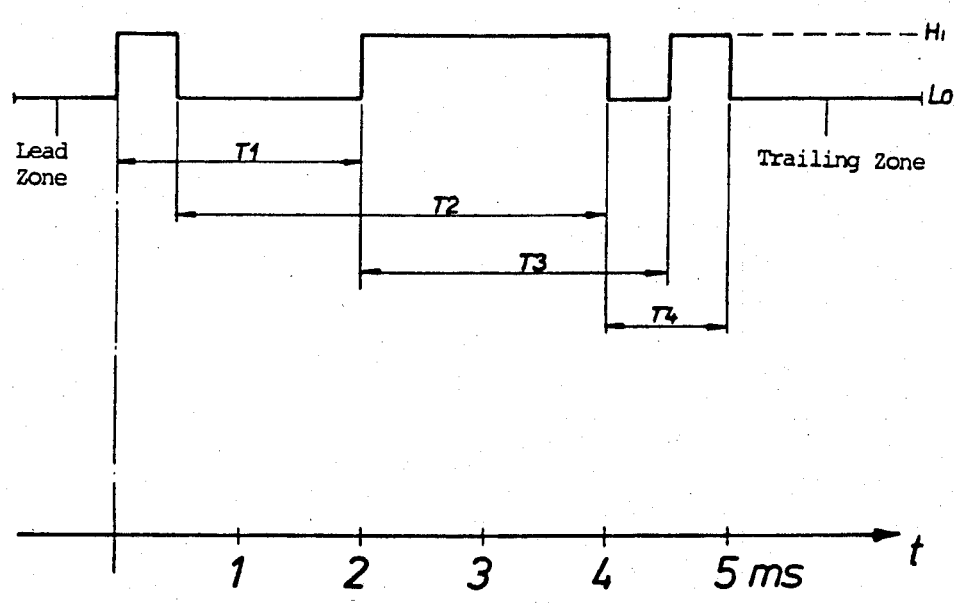
FIG. 5 shows a portion of the video signal as a function of time which corresponds to the contrasting line pattern of FIG. 4(a)

FIG. 5 shows a section of the video signal obtained from scanning a PIC pattern in accordance with FIG. 4(a) as an electric binary signal, the amplitude Hi being allocated to the dark areas of the pattern and the amplitude Lo to the light areas of the pattern. Light-dark fluctuations within the individual lines and the spacings of the PIC pattern are elimanated from the electric signal immediately after scanning. The video signal section shown in FIG. 5 includes a signal free lead zone that corresponds to the lead zone 56 in FIG. 1, a first interval T1 which extends from the first ascending flank or slope to the second ascending flank or slope, a second interval T2 which extends from the first descending flank to the second descending flank, a third interval T3 which extends from the second ascending flank to the third ascending flank, and a fourth interval T4 which extends from the second descending flank to the third descending flank. It also includes a trailing zone that corresponds to the trailing zone 58 of FIG. 1.

The PIC pattern, for example the one shown in FIG. 5, is decoded according to the delta distance method, which determines whether successive and overlapping intervals, that is T1, T2 and T2, T3 and T3, T4 have a predetermined ratio relative to each other as given by the PIC pattern which is to be decoded. If the value of the quotients of successive overlapping interval lengths falls within predetermined value ranges, the size of the range being determined by printing blurrs or digitalization inaccuracies, then in all probability the searched-for PIC pattern is present.

Figure 6:
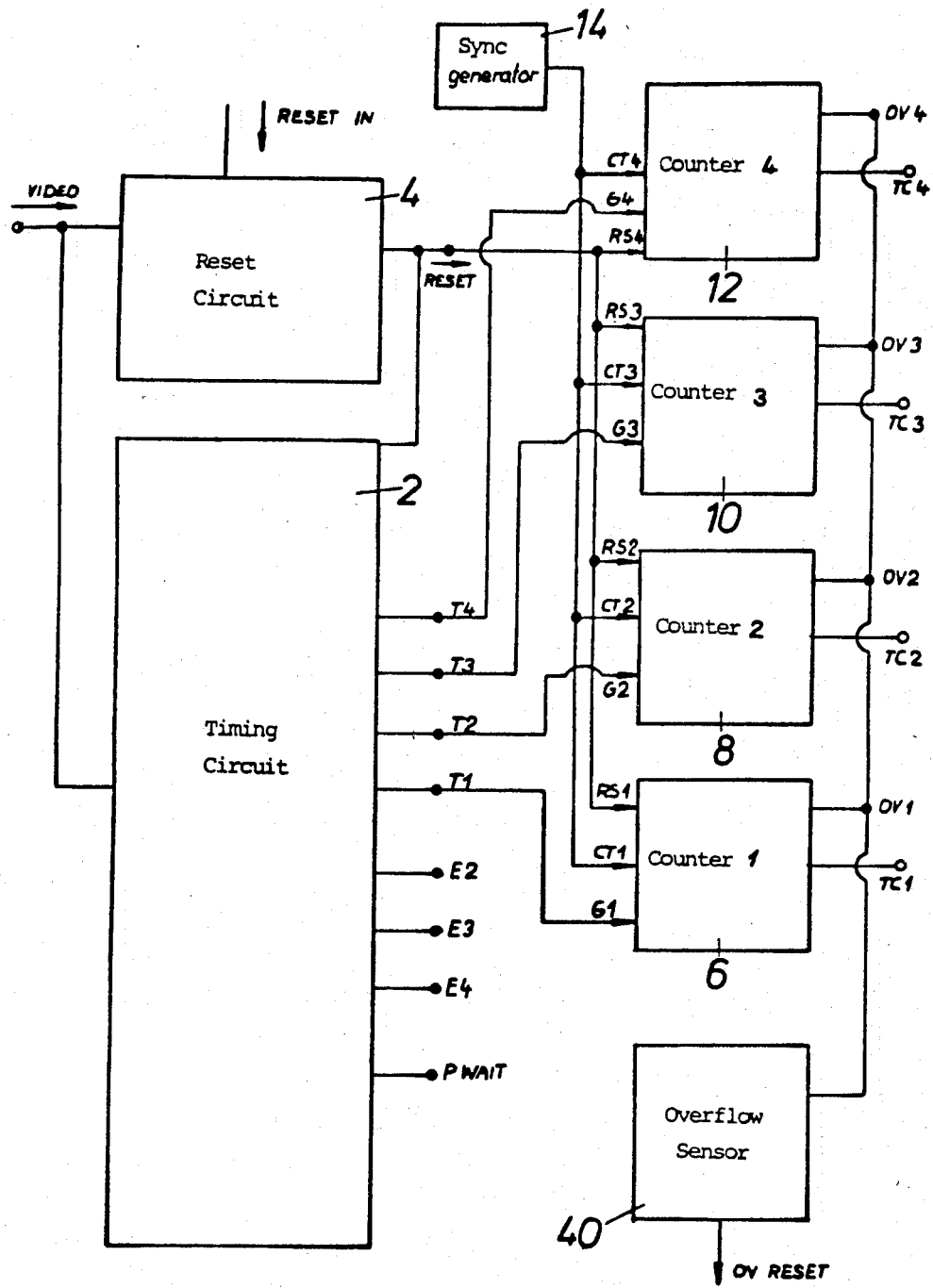
FIG. 6 is a block diagram of the counting circuit of the decoder.
Figure 11:
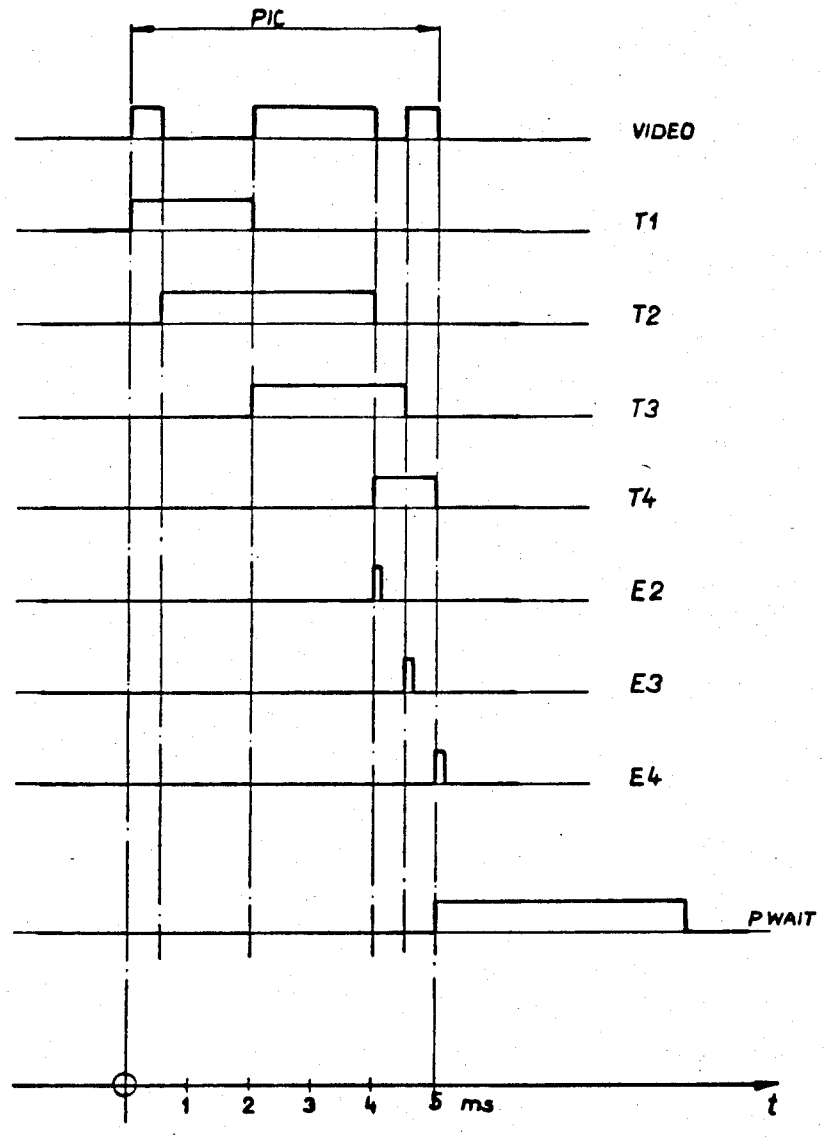
FIG. 11 is a pulse diagram of the pulses generated in the timing circuit of the counting circuit.

FIG. 6 shows the counting circuit, which forms the input of the decoder of the invention, and which counts the interval lengths T1 to T4 and makes them available as binary values for further processing. The counting circuit contains a timing circuit 2 to which the video signal "VIDEO" is fed and which emits at a first output a first gate signal from a first rising slope to a second rising slope of the video signal a second gate signal T2 at a second output from a falling slope following the first rising slope to a second falling slope of the video signal, a third gate signal T3 at a third output from the second rising slope to the next, third, rising slope, and a fourth gate signal T4 at a fourth output from the second falling slope to the next, third, falling slope. See also the pulse schematic shown in FIG. 11.

The gate signals T1 and T4 are fed individually to the gate inputs G1 to G4 of the four counters 6, 8, 10 and 12, respectively. Each counter receives at its input CT1 to CT4 sync pulses from a sync generator 14 which are counted by the counters so long as the respective gate signals T1 to T4 are applied. The result obtained at the outputs TC1 to TC4 of the counters 6 to 12 then represents a measure for the length of the gate signals T1 to T4.

In the timing circuit 2, a release signal E2 is generated by the falling slope of the gate signal T2, a release signal E3 is generated by the falling slope of the gate signal T3, and a release signal E4 is generated by the falling slope of the gate signal T4. The release signals are emitted at separate outputs. The release signal E4 further generates a signal PWAIT the length of which corresponds to the signal-free trailing zone after the end of the gate signal T4, and it too is emitted at a separate output.

The counting circuit further includes a reset circuit 4 which receives the video signal VIDEO, and an external reset signal "RESET IN" at a separate input at the start of each scan line. The reset circuit 4 emits a reset signal RESET to the reset inputs RS1 to RS4 of the counters 6 to 12 as well as to the timing circuit 2 and resets the counters 6 to 12 as well as the timing circuit 2 into an active starting condition when the video signal contains a signal-free section—of an amplitude Lo—which is larger than the maximum scanning distance between the lines of the PIC patterns as given by the maximum spacing within the PIC pattern, multiplied by the largest permissible scanning angle.

The counting circuit further contains an overflow sensor 40 which is responsive to an overflow or carry-over output OV1 to OV4 of the counters 6 to 12 and emits a reset signal "OV RESET", and then resets the decoder into a new state of readiness.

Figure 7:
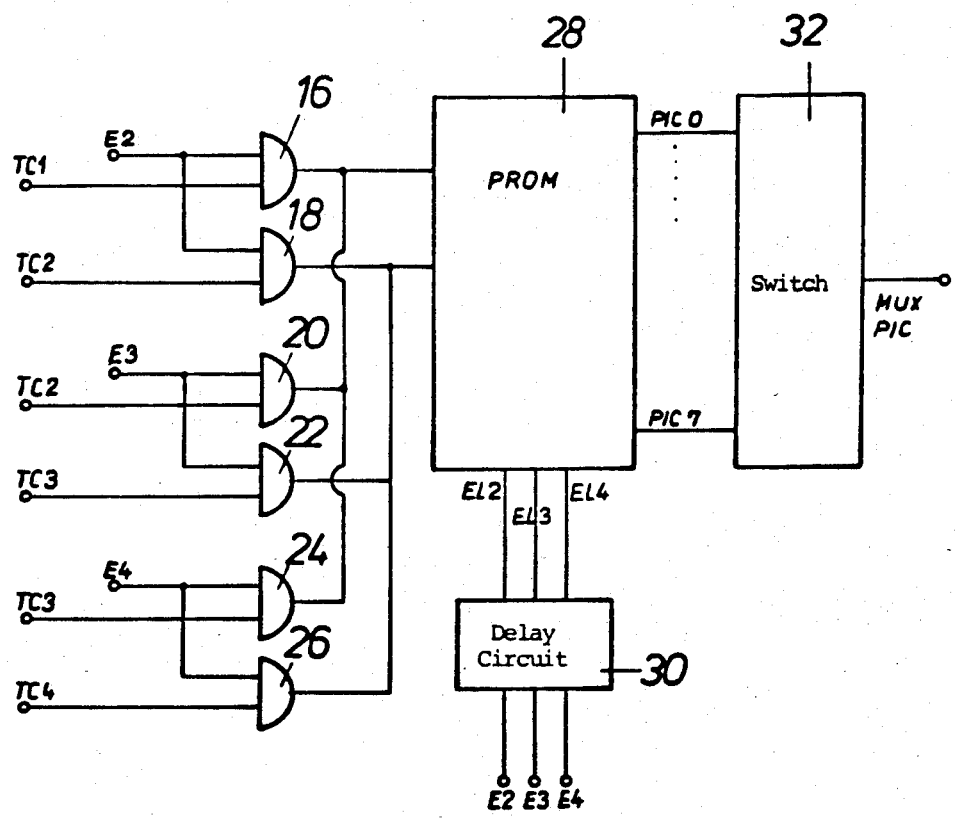
FIG. 7 is a block diagram of the comparison table of the decoder.

FIG. 7 shows an embodiment of the comparison table of the decoder which includes a read-only memory or PROM 28. PROM 28 is organized so that count TC1 of the counter 6, addresses individual lines of the memory matrix and count TC2 of the counter 8 addresses individual columns of the first memory matrix. Counts TC1 and TC2 are applied to PROM 28 by the release signal E2 via the gate circuits 16, 18 after TC2 has been counted. The first memory matrix includes an expectancy field which encompasses the memory positions where the quotient of the line address and the column address falls within a predetermined value range. This value range corresponds to the quotient of a first interval length to a second interval length of the PIC pattern under consideration. If a memory position within the expectancy field is addressed by counts TC1 and TC2, a reference signal having a first amplitude, for example Hi, is emitted which signals that information had been scanned which corresponds to a portion of the PIC pattern under consideration.

To correspondingly compare the gate pulses T2 with gate pulse T3, the count TC2 of the second counter 8 addresses the lines of a second memory matrix, and the count TC3 of the third counter 10 addresses the columns of the second memory matrix. The addressing takes place via gates 20, 22 after the count TC3 has been counted and the counts TC2 and TC3 are sent to PROM 28 by the release signal E3. The second matrix also includes an expectancy field which encompasses the memory positions whose quotient of line address and column address falls within a predetermined range which is equal to the value range of the quotient of the intervals of the PIC pattern corresponding to gate signals T2 and T3. When a memory position in the expectancy field is addressed, a reference signal having a first amplitude, for example the amplitude Hi, is emitted. When a memory position outside the expected field is addressed, a reference signal having a second amplitude Lo is emitted.

Comparison of the count TC3 of the third counter 10 with the position TC4 is accomplished likewise by addressing lines and columns of a third memory matrix which also includes an expectancy field. When a memory position within the expectancy field is addressed, a reference signal having a first amplitude Hi is emitted. The third memory matrix is addressed via gates 24, 26 after the count TC4 of the fourth counter 12 has been counted and the counts TC3 and TC4 are sent to the PROM 28 by the release signal E4. Gates 16 to 26 comprise AND gates.

Figure 12:
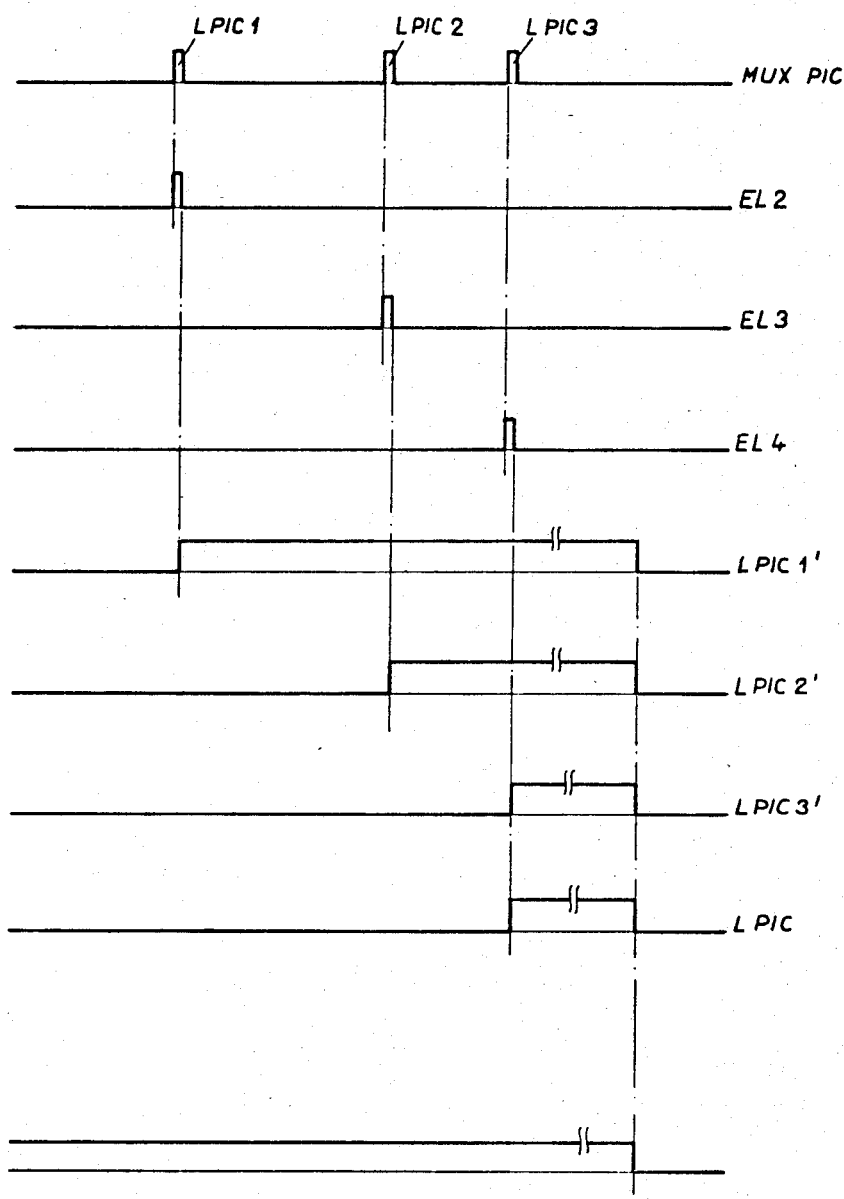
FIG. 12 is a pulse diagram or the pulse processed within a selecting circuit.

The release of comparison signals LPIC1 and LPIC2 and LPIC3 is effected by the release signals EL2, EL3 and EL4 which are obtained by delaying the release signals E2, E3, and E4 in the delay circuit 30; see also the pulse plan of FIG. 12. Read-out may only take place after the first, second and third memory matrix have been addressed.

As an alternative to the embodiment shown in FIG. 7, the first memory matrix may be defined by a first read-only memory, PROM 1, the second memory matrix by a second read-only memory, PROM 2, and the third memory matrix by a third read-only memory, PROM 3. In this embodiment, shown in FIG. 8, three read-only memories of relatively low storage capacity can be employed. NOT gates 77 are used to invert the pulse shapes of release signals EL2, EL3 and EL4.

The read-only memory 28 has storage locations each of which has an n-bit capacity, for example n=8. Since for the provision of an expected field only one bit of each storage location defining the expected field is occupied, up to n different expected fields for n different PIC patterns can be simultaneously accommodated, whereby preferably n=8, and the first expected field in PROM1 is accommodated in the first bit of the memory positions, the second expected field in the second bit of the memory positions, and so forth. The same applies for PROM 2 and PROM 3. The line and column addressing for a specific PIC pattern must then occur selectively to the corresponding bits of the memory positions. Further, a switch 32 coupled to PROM 28 selectively reads out the comparison signals LPIC1 and LPIC2 and LPIC3 from the pertinent bits of the memory positions and transmits as its output to an evaluation circuit the evaluation signal MUX PIC, formed of the sequential comparison signals LPIC1, LPIC2 and LPIC3.

Figure 9:
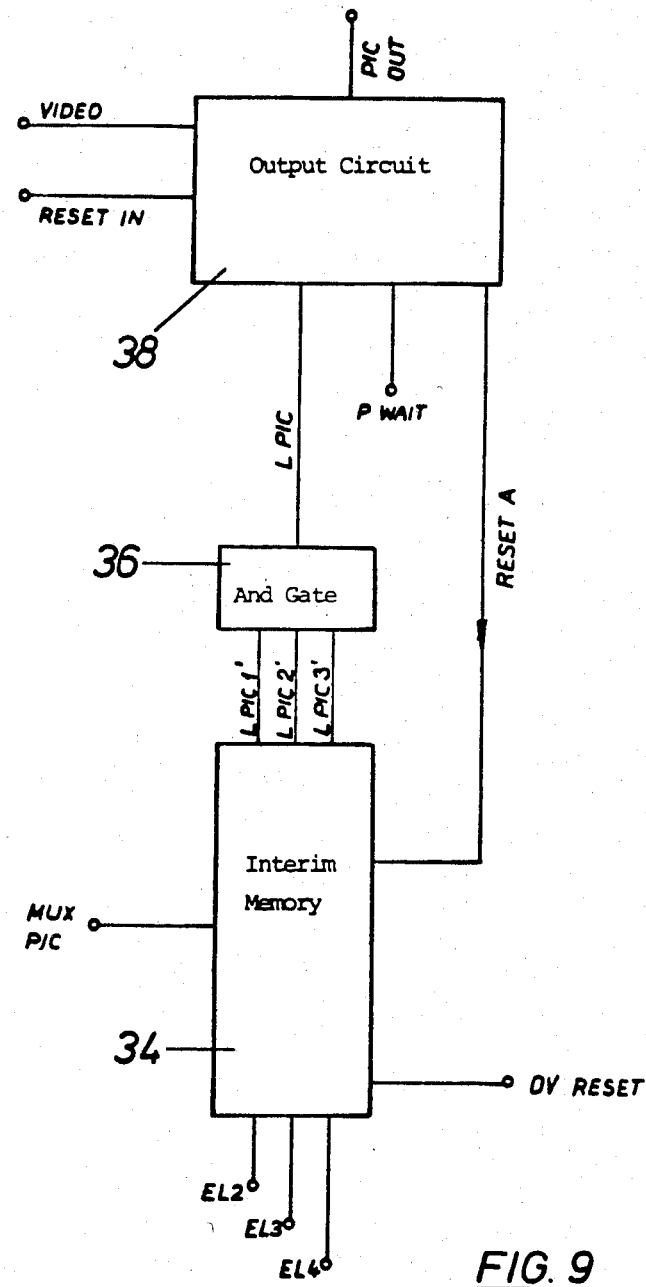
FIG. 9 is a block diagram of the evaluation circuit of the decoder.

FIG. 9 illustrates the evaluation circuit of the decoding device. An interim memory 34 receives the evaluation signal MUX PIC and stores the comparison signal LPIC1—which indicates that the value TC1/TC2 falls within a predetermined range—as well as comparison signals LPIC2 and LPIC3. Storing is commenced by release signal EL2 and EL3 and EL4 which are generated substantially simultaneously with the comparison signals LPIC1, LPIC2 and LPIC3, see the pulse schematic of FIG. 12. After all comparison signals have been stored in the interim memory as storage signals LPIC1', LPIC2', LPIC3', the storage signals are transmitted to an AND gate 36 which emits an output signal LPIC when all storage signals LPIC1' etc. have a first amplitude corresponding to the first amplitude of the comparison signals LPIC1 etc., see FIG. 12. The output signal LPIC is fed to an output circuit 38 which receives the video signal VIDEO and the hold signal PWAIT from the control circuit 2. The output circuit 38 generates an identification signal "PIC OUT" when the video signal VIDEO remains on amplitude Lo while hold signal PWAIT is applied. The amplitude Lo identifies a signal-free subsurface. This ensures that the decoded line pattern is followed by a signal-free trailing zone which corresponds to the trailing zone 58 of the PIC pattern.

The output circuit 38 is reset by the external reset signal "RESET IN" and thereupon applies a reset signal RESET A to the interim memory 34 and resets the latter for a new cycle. The interim memory is further reset by the overflow reset signal "OV RESET" when one of the counters 6 to 12 signals an overflow.

Figure 10:
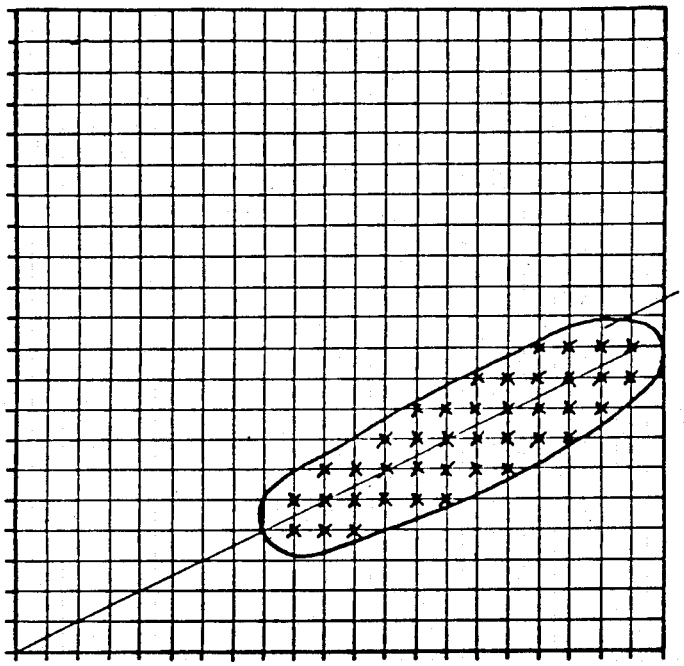
FIG. 10 is a schematic representation of the structure of the comparison table.

FIG. 10 is a schematic representation of the organization of the comparison table, for example the partial comparison table of PROM 1 for comparing the quotient TC1/TC2. The table comprises a memory matrix and its lines and columns have the appropriate binary addresses. In accordance with a preferred embodiment of the decoder of the invention, a 5-bit representation has been selected. All memory positions with a specific value of the quotient of line address to column address lie on one line, the so-called expectancy line around which the expectancy field is located. Within the field all those memory positions are located which address quotients that fall in the predetermined value range. The counts TC1 to TC4 are also emitted as 5-bit words. The count TC1 addresses the lines of the table, the count TC2 addresses the columns of the table.

Figure 8:
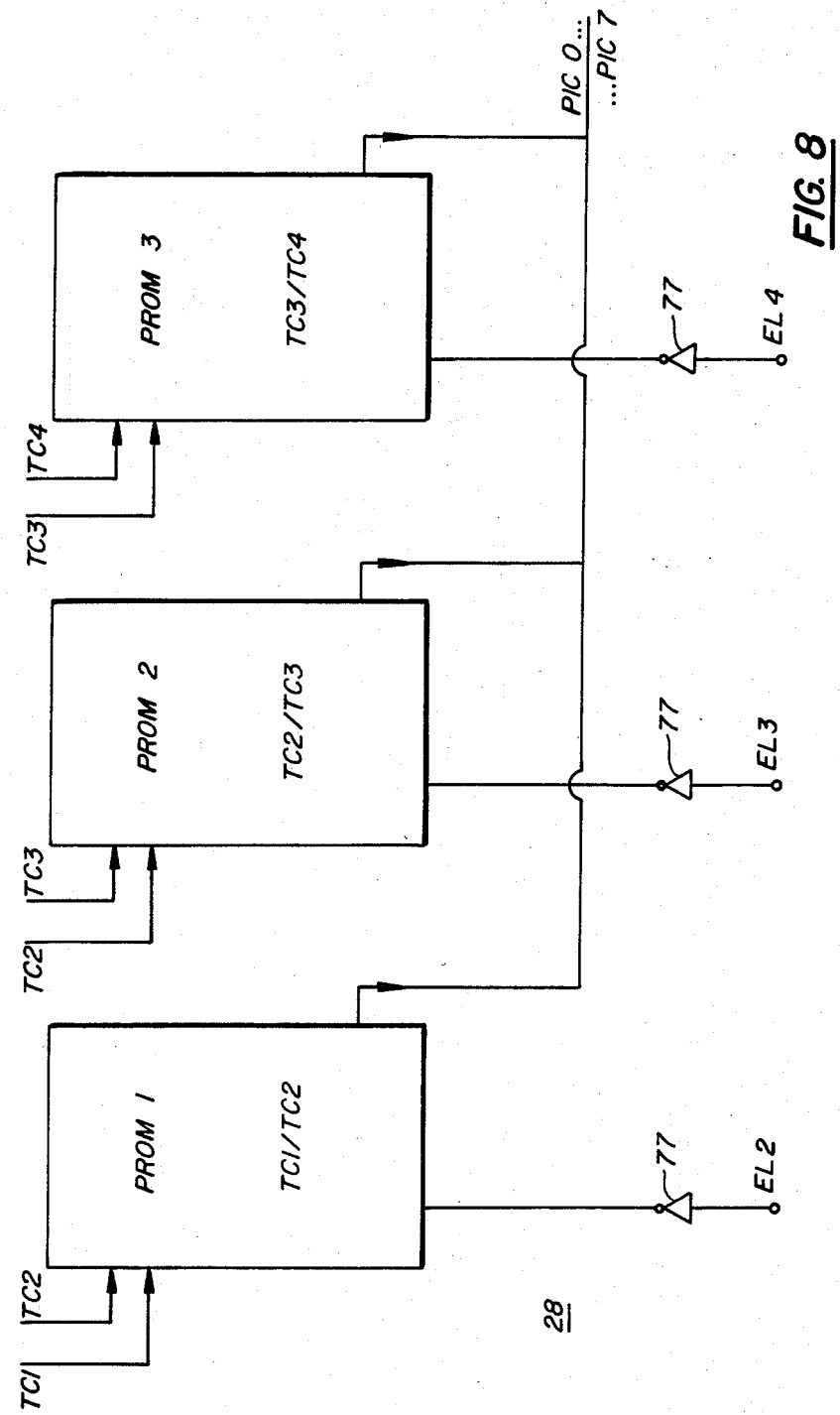
FIG. 8 is another embodiment of the comparison table of the decoder.
Figure 13:
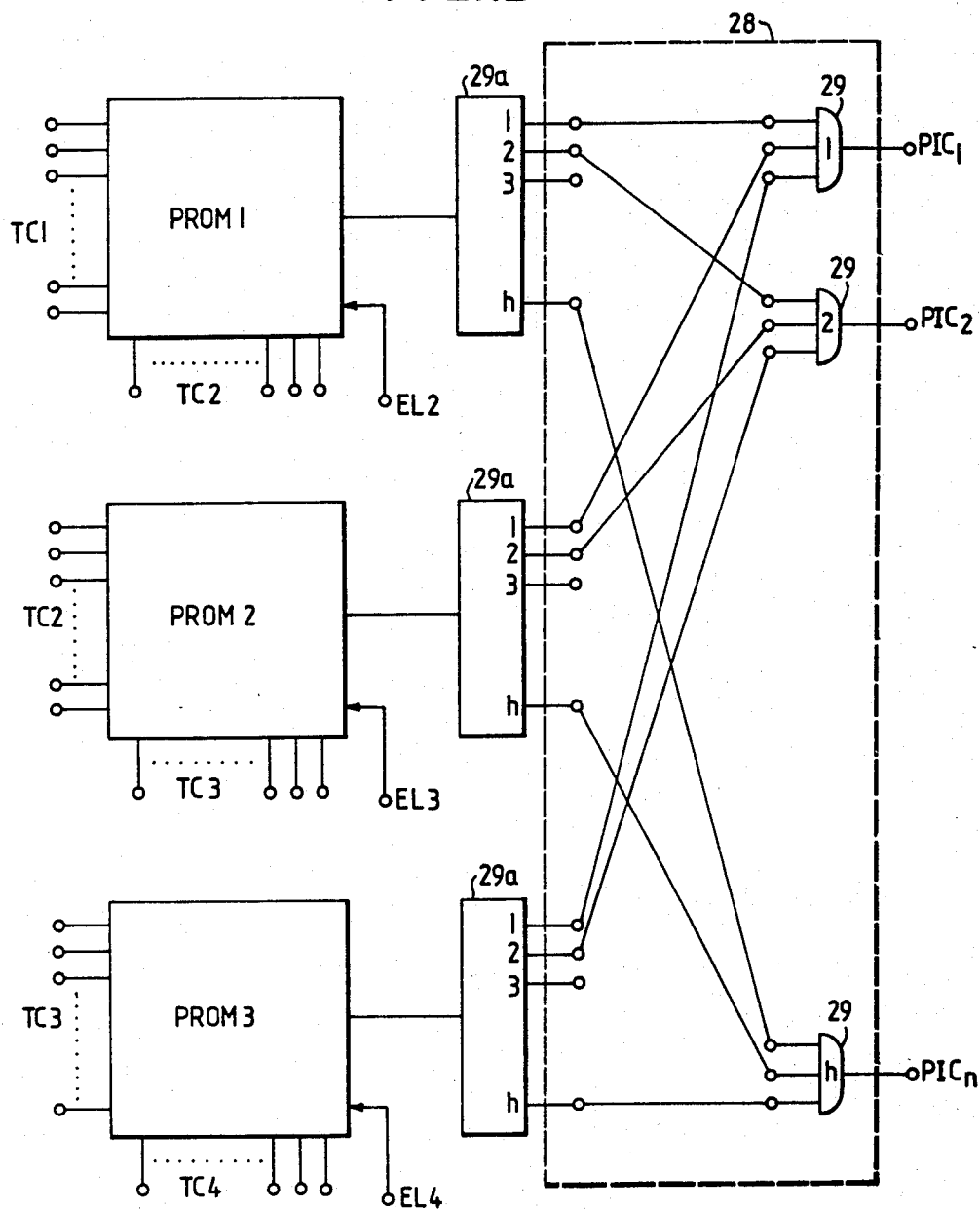
FIG. 13 a circuit diagram of a further embodiment of the comparison table according to FIG. 8, including a gating circuit for selectively reading out different expected fields of each read-only memory.

FIG. 13 shows a circuit diagram of a further embodiment of the comparison table according to FIG. 8. The comparison table includes a first read-only memory PROM 1, the lines of which are addressed by the measured first count TC1, and the columns of which are addressed by the second measured count TC2, included is further a second read-only memory PROM 2, and the measured second count TC2 addresses its lines, the measured third count TC3 addresses its columns. Included is additionally a third read-only memory PROM 3, and the measured third count TC 3 addresses its lines, the measured fourth count TC 4 addresses its columns. Thus, each read-only memory PROM 1, PROM 2, . . . provides a two-dimensional line and column organized storage matrix to realize comparison tables for respective two successively measured counts of the contrast line pattern.

Each location of the memories PROM 1, PROM 2, . . . addressed by its line and column, stores a n-bit data word with $n \geq 1$, preferably $n=8$. For identifying m different contrast line patterns, with $n \geq m \geq 1$, the expected field for a m-th contrast line pattern $PIC_m$, $m = 1, 2, 3 . . .$, is stored in the m-th bit of the n-bit data words by writing the value Hi in the respective bit whereas the n-th bits of memory locations outside the expected field have the amplitude Lo.

The output of the read-only memories PROM 1, PROM 2, . . . is fed to a gating circuit 28, with n parallel AND-gates 29. The AND-gates 29 have as many input terminals as exist read-only memories PROM 1, PROM 2, . . . .

Between the output of each read-only memory PROM 1, PROM 2, . . . and the gating circuit there are provided interfaces 29a, which emit at their output the data word received from the read-only memory in bit parallel form. The interfaces 29a have n outputs, the first output emitting the first bit, the second output the second bit, the third output the third bit etc. of the received n-bit data word. The n AND-gate 29 are coupled to the interfaces 29a such that the m-th AND-gate receives at its different input terminals as input signal the m-th bit of the data words received from the different read-only memories. Each AND-gate emits an output signal $LPIC_m$ when all its input signals have the amplitude Hi, i.e. when the m-th bit of all read-only memories have the amplitude Hi, thus, signalizing that the actually read contrast line pattern $PIC_m$ lies in the m-th expected field and is identified without failure.

Thus, when the first AND-gate 29 emits a pulse, a first contrast line pattern $PIC_1$ is read and identified. If the m-th AND-gate 29 emits a pulse, the m-th contrast line $PIC_m$ is read and identified.

The output of the n AND-gates are connected to a selection circuit (not shown). This selection circuit is adjustable such that it emits an output signal only when the selected contrast line pattern PIC is read and identified.

I claim:

1. In a method for identifying objects appearing at random positions in random orientation, and at random times on an image window and having, on a surface facing the image window, an identification in the form of a field which includes on at least one data track contrasting indicia with at least one contrasting line pattern identifying the position and the orientation of the data track and having a plurality of parallel lines with variable spacing and/or line widths, the image window being scanned line-by-line and a binary video signal being generated which corresponds to the scanned contrast sequence, the image window being, in a first method step, scanned under varying angles until a contrasting line pattern is detected, the position and alignment of the data field relative to the image window being determined in a second method step and, in a third method step, a raster scan in the direction of the data track being performed and the indicia present on the data track being read and decoded, the improvement to the method comprising the steps of identifying the contrasting line pattern by measuring the length of the overlapping intervals of the video signal comprising at least one light-dark region, comparing pairs of successively measured interval lengths in a two-dimensional comparison table within which the possible discrete values of an interval length are assigned to table lines and the possible discrete values of the next following measured interval length are assigned to table columns, said comparison table including an expected field encompassing the positions on the table in which the quotient of the two successively measured compared interval lengths falls within a given value range, generating a comparison signal having a first amplitude when two interval lengths which are being compared have a ratio to each other which corresponds to a table position within said expected field, and emitting an identification signal when, during each of a number of successive comparing steps as determined by the contrasting line pattern, a reference signal having a first amplitude is generated.

2. A method according to claim 1, wherein the expected field lies in an area of the table limited by a line and a column corresponding to minimum and maximum interval lengths.

3. A method according to claim 1, wherein first and second successively measured intervals which are to be compared are fed into an individual comparison table having its own expected field and being assigned to the first and second measured intervals.

4. A method according to claim 3, wherein differing expected fields for corresponding successively measured interval lengths of various contrasting line patterns are included in the individual comparison table, and wherein an individual identification signal for each contrasting line pattern is emitted when identifying the corresponding contrasting line pattern.

5. A method according to claim 1 including the step of providing successively measured intervals to the comparison table in pairs after the later measured interval length has been measured.

6. A method according to claim 1, wherein the video signals include rising and falling slopes and wherein the measuring step comprises the step of measuring the intervals of the video signal from one rising slope to the next rising slope and, overlapping therewith, from a falling slope lying between the rising slopes to the next falling slope.

7. A method according to claim 1 wherein the contrasting line pattern includes a lead zone of predetermined length which is free of signals, and including the step of initiating the measuring step only after a signal-free lead zone of the predetermined length has been detected in the video signal.

8. A method according to claim 1 including the step of terminating the measuring step when a measured interval length exceeds a predetermined maximum value which corresponds to the maximum interval length present in the contrasting line pattern.

9. A method according to claim 1 including the step of terminating the measuring step and initiating a new measuring step when the ratio of two successively measured interval lengths is outside the predetermined value range, resulting in the generation of a reference signal having a second amplitude.

10. A method according to claim 1 wherein the measuring step includes the steps of counting the interval lengths digitally as a multiple of the given sync period to form a binary signal, and subsequently using the binary signal.

11. A method according to claim 1 including the step of scanning a given line of the image field n times, and emitting the identification signal only in response to identifying a contrasting line pattern n times in succession.

12. A method according to claim 3 wherein each individual comparison table includes a first expected field corresponding to successively in forward direction measured interval length of a contrast line pattern, and a second expected field corresponding to successively in reward direction measured interval lengths of this contrast line pattern, and wherein a first identification signal (PIC OUT V) is emitted when the contrast line pattern is identified by scanning in forward direction, and wherein a second identification signal (PIC OUT R) is emitted when the contrast line pattern is identified by scanning in reward direction.

13. A method according to claim 4 wherein each identification appearing on the image window comprises a plurality of different contrast line patterns ($PIC_m$, m=1, 2, 3, . . . ) and wherein an individual identification signal ($PIC_m$ OUT, m=1, 2, 3, . . . ) is emitted when the corresponding contrast line pattern is identified.

14. In an apparatus for identifying objects appearing at random positions in random orientation, and at random times on an image window and having, on a surface facing the image window, an identification in the form of an image field which includes on at least one data track contrasting indicia with at least one contrasting line pattern identifying the position and the orientation of the data track and having a plurality of parallel lines with variable spacing and/or line widths, the image window being scanned line-by-line and a binary video signal being generated which corresponds to the scanned contrast sequence, the binary video signal including rising and falling slopes defining a first interval from one rising slope to the next rising slope and a second, successive, overlapping interval from one falling slope to the next falling slope, the image window being, in a first step, scanned under varying angles until a contrasting line pattern is detected, the position and alignment of the data field relative to the image window being determined in a second step and, in a third step, a raster scan in the direction of the data track being performed and the signals contained on the data track being read and decoded, the apparatus having an opto-electronic scanning device including a rotatable scanning raster which emits at the output the binary video signal corresponding to the image field which is scanned line-by-line and includes binarily the contrast pattern of the scanned line, a decoder for identifying the contrasting line pattern which identifies the position and orientation of at least one data track of a data field, means for aligning the scanning raster parallel to the data track and for reading the scanned indicia of the data track, the improvement of the decoder comprising a counting circuit which receives the video signal and counts the length of successive overlapping intervals of the video signal, a two-dimensional reference table for receiving successively counted interval lengths in pairs via a gate circuit and for emitting a comparison signal having a first amplitude when the compared interval lengths have a given ratio which corresponds to the ratio of the corresponding interval of the contrasting line pattern, and an evaluation circuit for generating an identification signal during a succession of a given number of comparison signals each having the first amplitude.

15. Apparatus according to claim 14 wherein the counting circuit includes a timing circuit for generating gate pulses which correspond to overlapping intervals of the video signal the pulse lengths of which is determined by successive rising slopes and by successive falling slopes of the video signal, respective counters activated by the gate pulses, the counters being jointly connected at their inputs with a sync generator, the counters generating a digital output defining the measured interval length, and means for applying the digital output to a reference table.

16. Apparatus according to claim 15 wherein the counting circuit includes means for detecting an overflow and for resetting the decoder when a counter overflows.

17. Apparatus according to claim 14 wherein the reference table comprises a two-dimensional read-only memory, wherein possible discrete counting values of a first interval length are addressed to associated lines of the read-only memory, wherein possible dicrete counting values of the subsequently counted interval lengths are addressed to associated columns of the read-only memory, and wherein an expected field within the memory encompasses the memory positions where the quotient of line address to column address falls within a given value range, so that a comparison signal with a first amplitude is emitted when a memory position within the expected field is addressed, and a comparison signal with a second amplitude is emitted when a memory position outside the expected field is addressed.

18. Apparatus according to claim 17, including a separate read-only memory with its own expected field for each two successive interval counting values.

19. Apparatus according to claim 18, including means for addressing in pairs to the associated read-only memory successively counted interval length when the later counted interval length is counted out and the timing circuit emits a release signal for activating the gate disposed in advance of the memory.

20. Apparatus according to claim 17 wherein each read-only memory includes selectively addressable different expected fields for differing contrasting line patterns, and wherein the comparison signals associated with the different fields are selectively fed via a switch to an evaluation circuit.

21. Apparatus according to claim 20 wherein each addressable location of the read-only memories stores a n bit data word ($n \geq 1$), wherein the expected field for a m-th contrast line pattern ($PIC_m$, $n \geq m \geq 1$) is stored in the m-th bit of the n bit data words by making this bit "hi", wherein the read-only memories are coupled to a gating circuit which emits an output signal $LPIC_m$ (m=1, 2, 3 . . . ) when the read-only memories are addressed, and the scanned contrast line pattern is identified.

22. Apparatus according to claim 21, wherein the gating circuit includes n parallel AND-gates, $n \geq m \geq 1$; m=1, 2, 3 . . . , wherein the m-th bit of the data words stored in the read-only memories are said to the inputs of the m-th AND-gate which emits the output signal $LPIC_m$ when all inputs are "hi".

23. Apparatus according to claims 20 or 21 or 22, wherein a first expected field is provided for the successively measured intervals counts of a contrast line pattern scanned in forward direction (for example scanned from left to right), wherein a second expected field is provided for the successively measured interval counts of said contrast line pattern scanned in rearward direction (scanned from right to left), and that an identification signal is emitted when identifying the contrast line pattern, said identification signal including information which characterizes the relative scanning direction.

24. Apparatus according to claim 14 wherein the evaluation circuit comprises an interim memory for storing the comparison signals until the last comparison signal is received and for feeding all comparison signals to separate inputs of an AND gate for emitting therewith an output signal when all comparison signals are present and have the first amplitude.

25. Apparatus according to claim 19, including an output circuit following the AND gate, the output circuit receiving as an input the video signal and a hold signal from the timing circuit and generating the identification signal whe, while the hold signal is applied, the video signal has a signal-free trailing section.

26. Apparatus according to claim 14, including a reset circuit receiving as its input the video signal and, at the start of each scan line, an external reset signal, the reset circuit emitting a reset signal when the video signal includes a signal-free section which is larger than the maximum scanning distance between the lines of the contrasting line pattern, and when an external reset signal is applied, and including means for feeding the reset signal to the counters and to the timing circuit for resetting them.

27. In a method for identifying objects appearing at random positions in random orientation, and at random times on an image window and having, on a surface facing the image window, an identification in the form of a field which includes on at least one data track contrasting indicia with at least one contrasting line pattern identifying the position and the orientation of the data track and having a plurality of parallel lines with variable spacing and/or line widths, the contrasting line pattern including a signal-free intermediate zone, the image window being scanned line-by-line and a binary video signal being generated which corresponds to the scanned contrast sequence, the image window being, in a first method step, scanned under varying angles until a contrasting line pattern is detected, the position and alignment of the data field relative to the image window being determined in a second method step and, in a third method step, a raster scan in the direction of the data track being performed and the indicia present on the data track being read and decoded, the improvement to the method comprising the steps of identifying the contrasting line pattern by measuring the length of the overlapping intervals of the video signal comprising at least one light-dark region, terminating the measuring step and initiating a new measuring step when the signal-free intermediate zone of a predetermined duration is detected in the video signal which corresponds in duration to the maximum scanning distance between lines of the contrasting line pattern, comparing pairs of successively measured interval lengths in a two-dimensional comparison table within which the possible discrete values of an interval length are assigned to table lines and the possible discrete values of the next following measured interval length are assigned to table column, said comparison table including an expected field encompassing the positions on the table in which the quotient of the two successively measured compared interval lengths falls within a given value range, generating a comparison signal having a first amplitude when two interval lengths which are being compared have a ratio to each other which corresponds to a table position within said expected field, and emitting an identification signal when, during each of a number of successive comparing steps as determined by the contrasting line pattern, a reference signal having a first amplitude is generated.

28. In a method for identifying objects appearing at random positions in random orientation, and at random times on an image window and having, on a surface facing the image window, an identification in the form of a field which includes on at least one data track contrasting indicia with at least one contrasting line pattern identifying the position and the orientation of the data track and having a plurality of parallel lines with variable spacing and/or line widths, the contrasting line pattern including a signal-free trailing zone having a predetermined width, the image window being scanned line-by-line and a binary video signal being generated which corresponds to the scanned contrast sequence, the image window being, in a first method step, scanned under varying angles until a contrasting line pattern is detected, the position and alignment of the data field relative to the image window being determined in a second method step and, in a third method step, a raster scan in the direction of the data track being performed and the indicia present on the data track being read and decoded, the improvement to the method comprising the steps of identifying the contrasting line pattern by measuring the length of the overlapping intervals of the video signal comprising at least one light-dark region, comparing pairs of successively measured interval lengths in a two-dimensional comparison table within which the possible discrete values of an interval length are assigned to table lines and the possible discrete values of the next following measured interval length are assigned to table columns, said comparison table including an expected field encompassing the positions on the table in which the quotient of the two successively measured compared interval lengths falls within a given value range, generating a comparison signal having a first amplitude when two interval lengths which are being compared have a ratio to each other which corresponds to a table position within said expected field, and emitting an identification signal when at least two successive comparison signals having said first amplitude are generated and in response to detecting the signal-free trailing zone of the predetermined length.

* * * * *